United States Patent [19]

Lengefeld

[11] Patent Number: 5,197,912
[45] Date of Patent: Mar. 30, 1993

[54] BUOY FOR ATTACHMENT TO THE NET LINE OF A FISHING NET

[76] Inventor: Ralf M. Lengefeld, Olgastrasse 140, 7301 Deizisau, Fed. Rep. of Germany

[21] Appl. No.: 751,341

[22] Filed: Aug. 29, 1991

[51] Int. Cl.⁵ .............................................. B63B 22/00
[52] U.S. Cl. ...................................... 441/133; 441/136
[58] Field of Search ................. 441/1, 81, 83, 84, 133, 441/136; 114/255, 266; 43/7; 405/67

[56] References Cited

U.S. PATENT DOCUMENTS

| | | | |
|---|---|---|---|
| 3,237,221 | 3/1966 | Thomson | 441/133 |
| 3,332,093 | 7/1967 | Skinner et al. | 441/133 |
| 3,597,779 | 8/1971 | Morgan | 441/133 |
| 4,029,049 | 6/1977 | Hillier | 43/7 |
| 4,655,156 | 4/1987 | Svirklys et al. | 114/266 |

*Primary Examiner*—Sherman Basinger
*Attorney, Agent, or Firm*—Akoo-Toren

[57] ABSTRACT

In order to change defective buoys on the net line of a fishing net and to change the spacing between the buoys threaded onto the net line, it has hitherto been necessary to release the net line from the net and to re-secure it to the net after re-arranging the buoys, thus to re-tie it. This is a very time-consuming task, which can now be avoided by use of the novel buoy. This novel buoy consists of two identical portions, thus of two halves, which engage against the net line and which can be assembled together effortlessly at the desired location for the complete buoy. To connect the halves, a clamping member disposed to surround the barrel-shaped buoy in a groove can be used.

5 Claims, 1 Drawing Sheet

BUOY FOR ATTACHMENT TO THE NET LINE OF A FISHING NET

Fishing nets which are intended to be placed standing vertically in a body of water are for the most part provided with a net line at the upper edge, which serves to receive the barrel-shaped buoys usually of plastics. These buoys, which are provided with a longitudinal passage, are drawn onto the net line, thus they are "threaded on". The net line is then connected or tied onto the net in such a manner that the neighbouring buoys are at a substantially constant spacing which depends on the weight of the net, the size of the buoys, and also on whether the net is to hang downwards from the surface of the water or whether the net is to be placed further down in the water. If a buoy becomes defective and has to be changed, it can be destroyed to remove it. The net line must then be released from the net, the other buoys moved and a new buoy "threaded on" at the end. The net line can then be re-secured to the net, which must be effected at at least one point and possibly also at two points between the individual buoys. This task has to be undertaken not only for replacement of defective buoys, but also when the spacing between the individual buoys has to be altered, because it is intended to use the net either higher in the water or lower in the water. This releasing of the net line from the net is a very time consuming task.

By virtue of the present invention, the object is achieved of easing this task, thus the replacement of a defective buoy and the re-distribution of the buoys on the net line in substantially less time. This takes place by using buoys which are also of plastics, are barrel-shaped, and have a passage on the longitudinal axis intended for reception of the net line, the novel feature residing in the buoys consisting of two identical portions, each of which comprises one half of the passage in the form of a shell. In this manner, it is possible to remove the buoys from the net line at any location and to put them onto the net line at any desired location, without having to release the net line from the net.

Embodiments of the invention will be described below with reference to the accompanying drawings.

Figure 1:
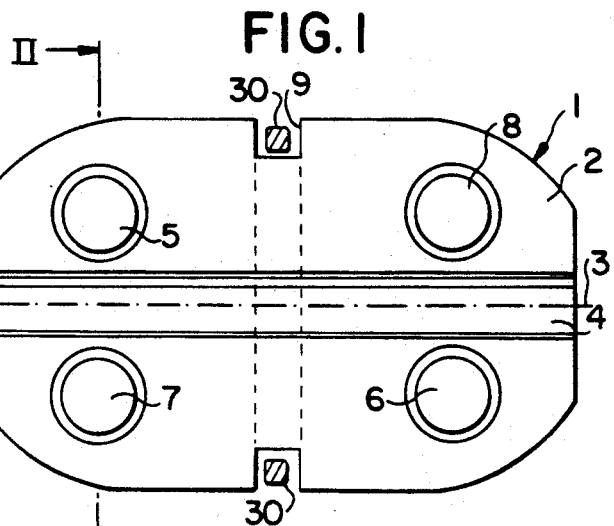
FIG. 1 shows a plan view of a buoy portion in the direction of the arrow I of FIG. 2, which shows a section on the line II—II of FIG. I.
Figure 2:
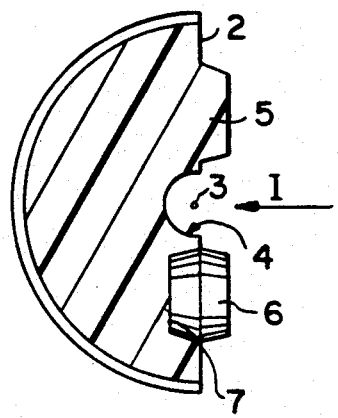

The portion 1 shown in FIGS. 1 and 2 of a barrel-shaped buoy forms a C-shaped half buoy and does this in a manner such that the section surface 2 is defined by the longitudinal axis 3 of the buoy, so that each buoy half has a passage half 4 of shell configuration. The cross-section of the complete passage which is concentric with the longitudinal axis 3 corresponds approximately to the cross-section of the line used as the net line, it being unnecessary for the passage to have the same cross-section over its entire length, as shown in the drawing; it can without any difficulty be provided with one or more narrowed sections, which inhibit displacement along the net line. Two spigots 5 and 6 are disposed on the section surface 2, thus on the surface with which one of the buoy parts abuts the other, the spigots 5 and 6 tapering somewhat, thus having a substantially frustoconical shape. These two spigots are located diagonally opposite one another. The surface is also provided with two recesses 7 and 8 which are diagonally opposite one another, these serving for reception of the spigots of the second buoy part, thus serving for reception of the second buoy half which is identical with the first half. Obviously, in place of the spigots, a differently formed raised portion or several raised portions and corresponding recesses may also be present, thus for example one or more ribs extending in the longitudinal direction of the buoy and recesses matching these. In order to hold the two buoy halves together, securing means may be used, which are located in the groove 9 in the external surface of the buoy, the groove being formed in at least one plane located approximately transverse to the longitudinal axis 3 of the buoy. Obviously, it is also possible to provide more than one groove and to place a securing element into each groove.

A clamping strip may be used as a securing element, for example, a strip consisting of a plastics material (shown only in cross section as element 30 in FIG. 1), the ends of the strip being held together by a buckle-type closure. It is, however, also possible to use a resilient ring with a suitable level of prestressing in the groove 9.

Any plastics material may be used as a material for producing the buoy half, of those materials used up to now in the manufacture of one-piece buoys for fishing nets, thus for the most part foam materials having a specific weight of about 0.4 g/cm3, the manufacture being effected in such a manner that the foaming takes place in a closed mould, so that every moulded component has a sealed outer skin.

In use of the novel buoys consisting of two halves, the net line can be secured once and for all to the net, thus not needing to be ever again separated from it. At the locations where a buoy is required, the two halves are positioned and held together permanently by means of a clamping member. If a buoy is damaged or has to be removed for other reasons, the clamping member is released and the buoy halves can be removed without difficulty from the net line and replaced at any desired position.

Figure 3:
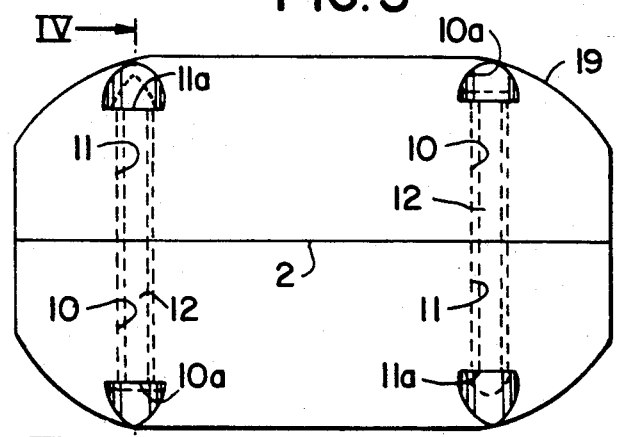
FIG. 3 shows a side view of a second embodiment.
Figure 4:
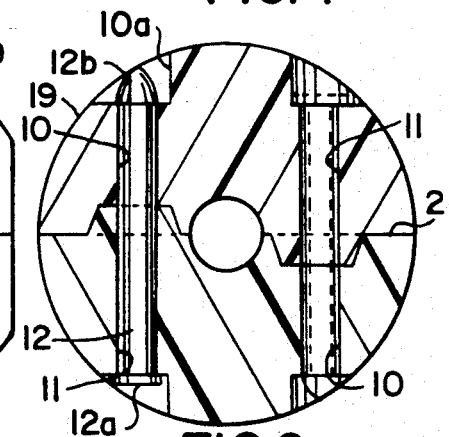
FIG. 4 shows a section on the line IV—IV of FIG. 3.

FIGS. 3 and 4 show a further embodiment of a buoy according to the invention. This differs from the embodiment described above in that it has no groove for a clamping member. In this case, each of the two spigots 5 and 6 and each of the two recesses 7 and 8 are provided with bores 10 and 11 opening into the outer surface 19 and having a step, 10a and 11a respectively, at the outer surface. Into at least two of these transverse passages thus formed, a bolt 12 is inserted which has a head 12a at one end and is provided with splayed tongues 12b at the other end. The two buoy halves are held together by means of these bolts. A sleeve-form tool is needed to remove the bolt 12, by means of which the splayed tongues 12b are pressed together so that the bolts 12 may be drawn out of the transverse passage.

Figure 5:
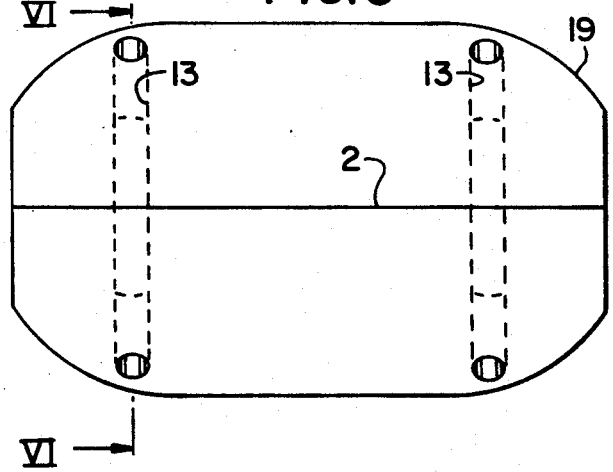
FIG. 5 shows a side view of a third embodiment.
Figure 6:
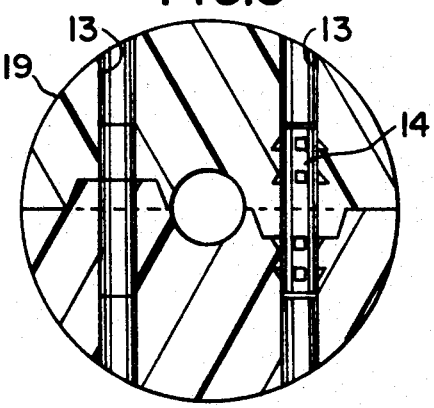
FIG. 6 shows a section on the line VI—VI of FIG. 5.

A third embodiment is shown in FIGS. 5 and 6. In this case also, bores 13 are provided which extend into the outer surfaces 19 through the spigots 5 and 6 and the recesses 7 and 8 and extend at least substantially at right angles to the section surface 2. Relatively short pins 14 provided with barbs are now inserted into these bores 13. The pins can be formed from plastics or metal, as can the bolts 12. Buoys of this kind can be used when it is not anticipated that the buoys will ever have to be removed and replaced. When a buoy or a buoy half is damaged and must therefore be replaced, it can be destroyed by tearing it off and then replaced by a new buoy half. This can also obviously be carried out substantially quicker than the troublesome releasing of the net line and tying it on again after the defective buoy has been replaced by a completely new buoy.

I claim:

1. A barrel-shaped buoy for a net line of a fishing net, comprising a body made of two identical C-shaped members releasably connected together to form a passage longitudinally through the body for holding the net line, each C-shaped member having two surfaces that engage with corresponding surfaces of the other C-shaped member, each of the surfaces having a frusto-conical protrusion and a complementary depression located so that the protrusions on each C-shaped member are arranged diagonally opposite one another and so that the depressions on each member are diagonally opposite one another, the protrusions and depressions of the two C-shaped members engaging with one another when the members are connected together.

2. A buoy according to claim 1, wherein the body has an outer surface with at least one groove extending in a plane transverse to the longitudinal axis for receiving a clamping member to hold the two halves together.

3. A buoy according to claim 2, wherein the clamping member is a releasable clamping strip of plastics material located in the groove, the strip holding the two halves together.

4. A buoy according to claim 2, wherein the clamping member is a resilient ring located in the groove.

5. A buoy according to claim 1, wherein the two members are held together by snap bolts, which are received in bores that extend at least substantially at right angles to the surface with which the two members engage against each other.

* * * * *